No. 656,255. Patented Aug. 21, 1900.
T. LEE.
DUST SEPARATOR.
(Application filed July 28, 1899.)
(No Model.)
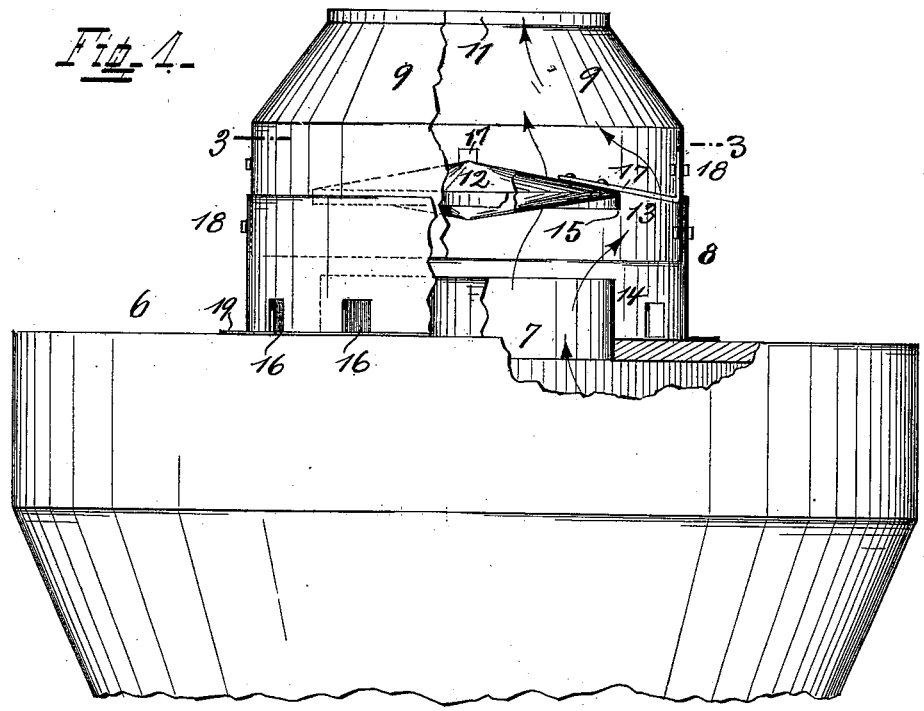
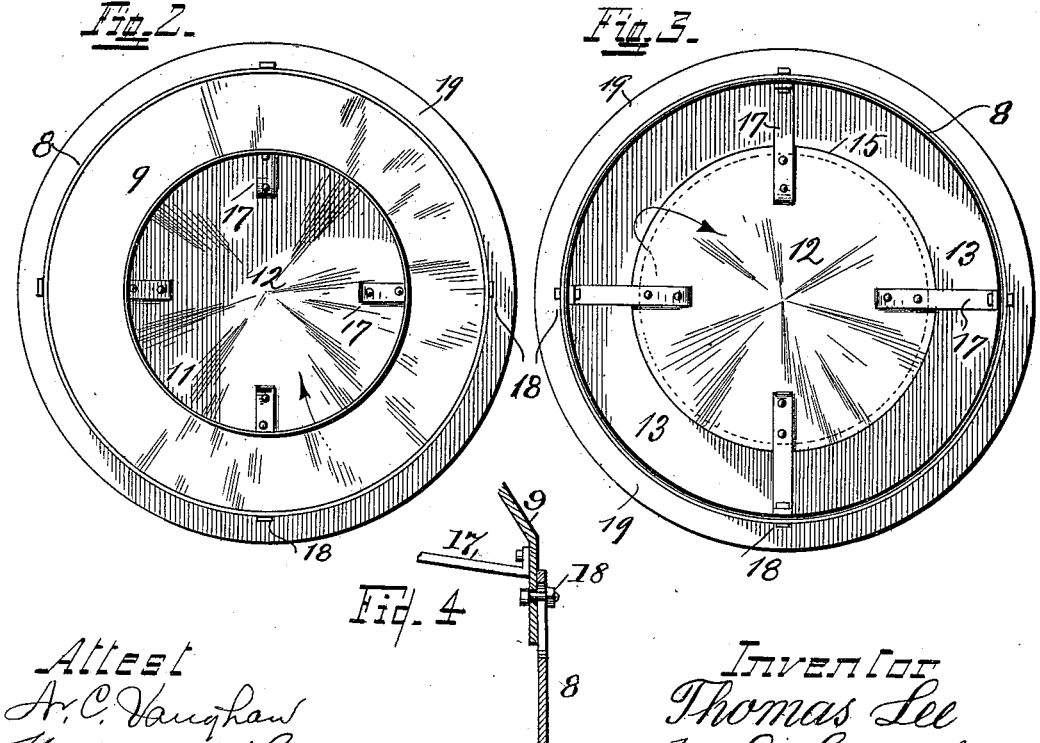

UNITED STATES PATENT OFFICE.

THOMAS LEE, OF HOME CITY, OHIO.

DUST-SEPARATOR.

SPECIFICATION forming part of Letters Patent No. 656,255, dated August 21, 1900.

Application filed July 28, 1899. Serial No. 725,366. (No model.)

*To all whom it may concern:*

Be it known that I, THOMAS LEE, a citizen of the United States, and a resident of Home City, Hamilton county, State of Ohio, have invented a certain new and useful Protected Air-Outlet for Dust-Separators; and I do declare the following to be a description of the invention sufficiently clear, full, and exact to enable others skilled in the art to which it appertains to make and use the same, attention being called to the accompanying drawings, with reference-numerals marked thereon, which form also a part of this specification.

The subject of this invention is a protected discharge-outlet for dust-separators of a type similar to and as shown in a patent issued to me on September 1, 1891, No. 458,773. Such dust-separators are devices serving in connection with certain other devices to remove from the place where it occurs dust and light waste as it happens in manufacturing establishments. This removal is generally accomplished by currents of air, which operating by suction carry the dust away as quick as it appears, the particular function of the dust-separator being to receive and concentrate all or a number of such dust-carrying currents and to separate from the dust and waste so concentrated the air which has carried them thus far. The withdrawal of this latter causes dust and waste to drop to the lower part of the dust-separator, where they discharge into a dust-chamber, while the air escapes at the top through an outlet thereat. It is this outlet with which my invention concerns itself; and one object is to construct the same in a manner to permit the concentrated air-currents to discharge therefrom without permitting rain or sparks to enter, particularly at such times when the dust separating and collecting system is not in operation—that is, when no air is discharging from the dust-separators. With this air there discharges also a certain quantity of extremely-fine flour-like dust, which can never be settled within and which usually hovers about dust-separators in shape of a cloud, accumulating finally on surrounding roofs and neighboring windows. To carry this fine dust as high up into the air as possible, so as to disseminate it throughout a larger space, thereby preventing it from settling within the immediate vicinity of the dust-separators, is another object of my invention. Finally, it is my object to use this outlet by throttling it more or less to regulate and adjust the draft through it, and thereby also the air-pressure within the dust-separator.

My invention consists of the provision of the means and of their construction, as shown and described, whereby these various objects are attained.

In the following specification, and particularly pointed out in the claims at the end thereof, is found a full description of my invention, together with its operation, parts, and construction, which latter is also illustrated in the accompanying drawings, in which—

Figure 1 is a side elevation, partly in section, of my protected discharge-outlet for dust-separators. Fig. 2 is a top view thereof, and Fig. 3 is a horizontal section on line 3 3 of Fig. 1. Fig. 4 is an enlarged sectional detail view showing manner of adjusting the telescoping sections of the stack.

6 is the top of a dust-separator of customary conical shape, and 7 is the circular outlet therein through which the compressed air discharges after having dropped the dust and waste carried by it into the dust-separator. This outlet I surround by a short stack 8, of larger diameter than outlet 7 and the upper part 9 of which is contracted, as shown, so that the extreme outlet 11 is again reduced to a size approaching the size of outlet 7. Between these outlets there is supported a hood 12 in shape of a flattened double cone, as shown, and of a diameter exceeding the diameter of outlet 7, so that its edge projects outwardly all around beyond this latter. This diameter is, however, less than the inside diameter of the stack, leaving an annular space 13 between the two, through which the air discharged from outlet 7 escapes, being guided thereto by the lower inverted cone of hood 12. Above this annular space the escaping volume of air is contracted again by the contracted part 9 of the stack, so that the final discharge takes place in form of a solid compact column of air, which shoots up straight into the air. The extremely-fine dust referred to before and which it is impossible to settle within the separator is thus carried straight up and disseminated at considerable height and throughout an extended space, which prevents its objectionable accumulation on surrounding roofs, windows, &c. Interfering air-currents or escape of air downwardly, which might weaken this centrally-discharging air-current, are prevented by top 6, parts of which close the space between rim 14 and stack 8.

Rain and sparks are kept out of the separator by means of hood 12, acting in conjunction with stack 8, which latter prevents lateral entrance between outlet 7 and hood 12. The upper conical part of this latter guides the rain onto the top of the dust-separator beyond outlet 7, a rim 14, turned up around the opening thereof, preventing the water from entering the latter. A drip 15 prevents water from returning and running inwardly on the lower or under side of hood 12. The water thus shed by this latter and running down between rim 14 and the stack escapes through lateral outlet-openings 16 in the latter. The hood is held up by braces 17, which are connected to the inside of the stack.

The pressure of the air inside of the dust-separator and the force of the draft through the discharge-outlet thereof are regulated and adjusted by the distance between outlet 7 and the under side of hood 12. This adjustment is accomplished by having the stack in two parts divided horizontally, telescopically engaged, and the hood carried by the upper part. Bolts 18 are used to accomplish the final connection of the adjusted parts, a slot or a number of bolt-holes being provided in one of the parts to be connected to provide for different positions of the bolts. (See Fig. 4.)

Around the lower edge of the stack is provided a flange 19, by which the structure complete as a whole is attached to the top of dust-separators by nails or soldering.

Having described my invention, I claim as new—

1. The combination of a circular dust-separator, having a flat top with a central circular air-outlet opening of much smaller diameter therein, an upwardly-projecting circular rim or curb surrounding this opening, a circular stack with a contracted outlet surrounding this rim, of considerable larger diameter, and having lateral outlets in its lower portion, and a conical hood or deflector of a diameter not less than the curb, and supported by the stack directly above and clear of the rim or curb.

2. The combination with the top 6 of a dust-separator, being entirely closed with the exception of a central air-outlet opening therein, a rim 14 surrounding this opening from the margin of which it projects upwardly, a stack 8 provided outside of rim 14 with a space between the two, both being secured to top 6, which closes this space and prevents passage of air-currents therethrough said stack consisting of two parts, telescopically connected, to permit adjustment of the upper part on the lower one, a hood carried within this upper part, being thus rendered vertically adjustable with this latter, with reference to the air-outlet opening below and lateral outlet-openings 16 in the lower part of stack 8.

In testimony whereof I hereunto set my hand in presence of two witnesses.

THOMAS LEE.

Witnesses:
 WALTER H. LEE,
 C. SPENGEL.